United States Patent [19]

Choi

[11] Patent Number: 5,611,580
[45] Date of Patent: Mar. 18, 1997

[54] RELEASE MECHANISM FOR FUEL FILLER DOOR

[75] Inventor: Suk J. Choi, Haewundae-Gu, Rep. of Korea

[73] Assignee: Hyundai Motor Company, Ulsan, Rep. of Korea

[21] Appl. No.: 370,103

[22] Filed: Jan. 9, 1995

[30] Foreign Application Priority Data

Aug. 23, 1994 [KR] Rep. of Korea .............. 94-21258

[51] Int. Cl.⁶ .................................. C05C 1/12
[52] U.S. Cl. .................. 292/164; 292/125; 292/201
[58] Field of Search .................. 292/164, 201, 292/125, DIG. 60, 122, 225, 110, 141, 171

[56] References Cited

U.S. PATENT DOCUMENTS

| | | | |
|---|---|---|---|
| 2,529,361 | 11/1950 | Abbas | 292/171 X |
| 2,612,397 | 10/1952 | Stutt | 292/171 X |
| 3,127,206 | 3/1964 | Jakeway | 292/164 |
| 3,915,491 | 10/1975 | Montgomery | 292/201 X |
| 3,924,427 | 12/1975 | San Juaquin | 292/171 X |
| 4,266,816 | 5/1981 | Mukai et al. | 292/125 X |
| 4,527,825 | 7/1985 | Clouse | 296/1 C |
| 4,782,978 | 11/1988 | Appleby et al. | 220/335 |
| 4,917,404 | 4/1990 | Pasquali et al. | 280/853 |
| 4,917,418 | 4/1990 | Gokee | 292/125 |
| 4,958,536 | 9/1990 | Baumgarten | 74/501.5 R |
| 4,971,382 | 11/1990 | Ohno | 296/97.22 |
| 5,076,622 | 12/1991 | Detweiler | 292/201 |

Primary Examiner—Rodney M. Lindsey
Assistant Examiner—Monica E. Millner
Attorney, Agent, or Firm—Birch, Stewart, Kolasch & Birch, LLP

[57] ABSTRACT

A fuel filler door release system for a vehicle, includes an outer casing having a longitudinal opening with first and second opposing open ends, and a piston having a piston portion, an insert groove and first and second inner end surfaces. A pivotal lever is also provided having a first arm inserted within the insert groove and a second arm selectively actuable by a release cable. A spring member biases the piston and a switch lever, so that the piston portion is extended through the second end of the longitudinal opening unless the first arm acts on the first inner end surface.

11 Claims, 2 Drawing Sheets

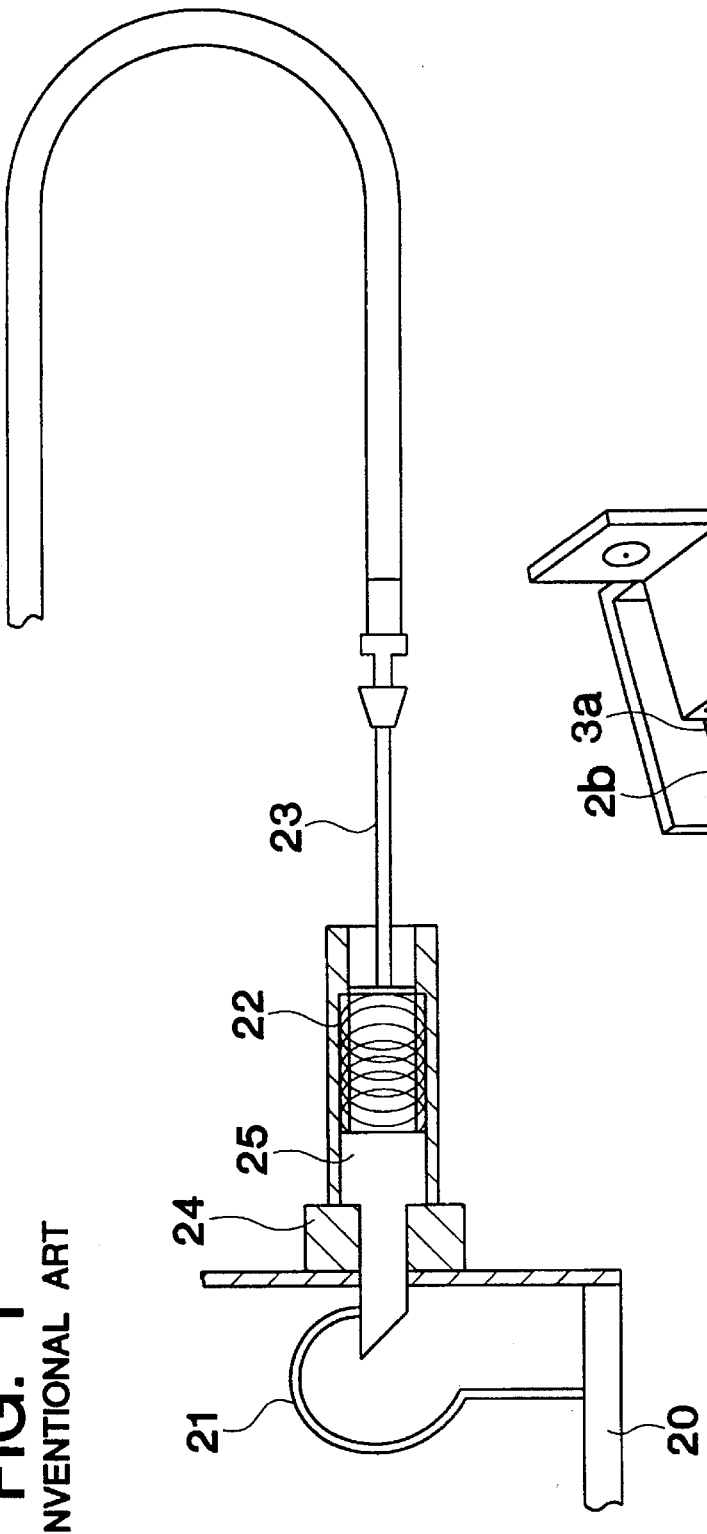
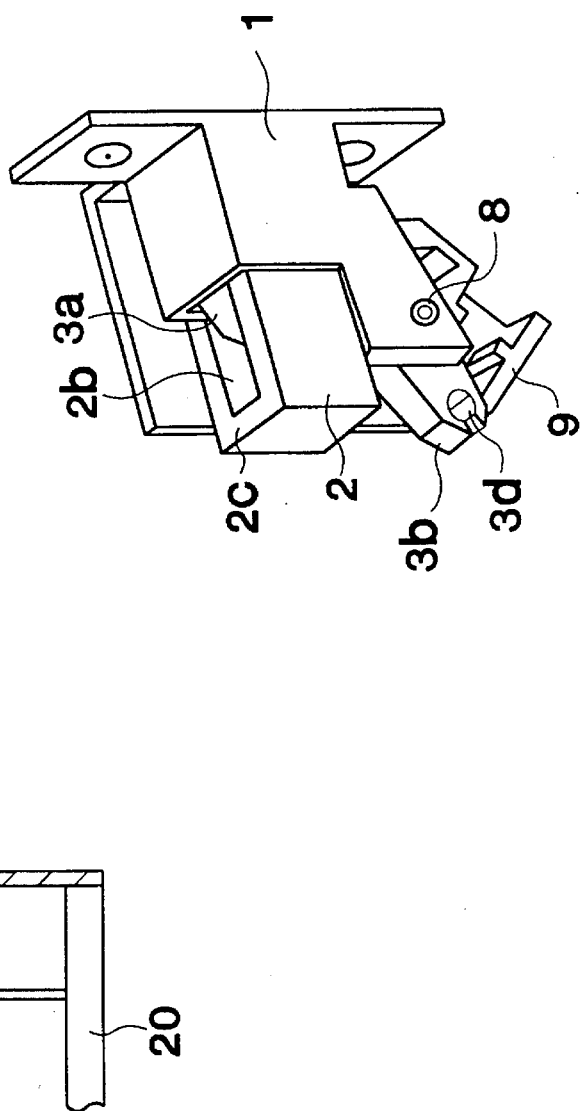

RELEASE MECHANISM FOR FUEL FILLER DOOR

BACKGROUND OF THE INVENTION

1. Field of the Invention

The present invention relates to a release mechanism for a fuel filler door of an automotive vehicle and more particularly, to a fuel filler door release system for a vehicle, which is a manually operated system which can be installed in a small space in the automotive vehicle.

2. Description of Related Art

Various types of fuel filler door release systems for a vehicle are known in the art. Such fuel filler door release systems include a piston and a piston spring in one straight line, and a long cable connected to the piston spring. For example, as shown in FIG. 1, a fuel filler door release system of such conventional fuel filler door release systems includes a fuel filler door 20, a hook plate 21 for locking or releasing the fuel filler door 20, a housing 24 having a piston 25 and a piston spring 22 for pressing the piston 25, a cable 23 connected to the piston spring 22, and a switch lever (not shown) disposed within reach of a driver's seat. However, these fuel filler door release systems suffer from a number of problems such as, for example, it is a long distance from the hook plate to the switch lever, it is expensive to manufacture, and it is difficult to make compact since such systems occupy an excessive space and limit installation options of the fuel filler door in a vehicle.

SUMMARY OF THE INVENTION

Accordingly, it is an object of the present invention to provide an improved release mechanism for a fuel filler door which eliminates the above problems encountered with conventional release mechanisms for a fuel filler door.

Another object of the present invention is to provide a release mechanism for a fuel filler door which is simple in structure, compact for portability, inexpensive to manufacture, durable in use, and refined in appearance.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to a release system for a fuel filler door of a vehicle which system includes an outer casing member having an opening, a piston slidably positioned within the outer casing, the piston including a piston portion, an insert groove and inner end surface at an end opposing the piston portion, such that the piston portion slidingly mates for connection through the opening, a pivotally movable lever having a first arm extending into the insert groove of the piston and a second arm selectively actuable by a release cable, a spring, and a switch lever whereby the piston portion is extended through the opening portion unless the first arm of said pivotally movable lever acts on the inner end surface for opening the fuel filler door.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 1 is a somewhat diagrammatic side view of a conventional release system for a fuel filler door of a vehicle;

FIG. 2 is a perspective view of the release mechanism for a fuel filler door of a vehicle according to the present invention;

DESCRIPTION OF THE PREFERRED EMBODIMENTS

Figure 3A:
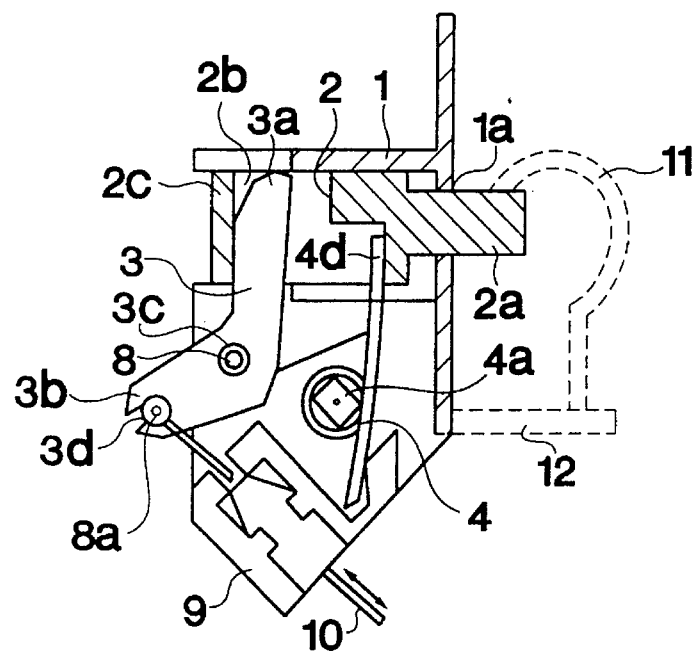
FIG. 3(A) is a sectional view of FIG. 1, showing operation of the release mechanism for a fuel filler door in a closed position according to the present invention.
Figure 3B:
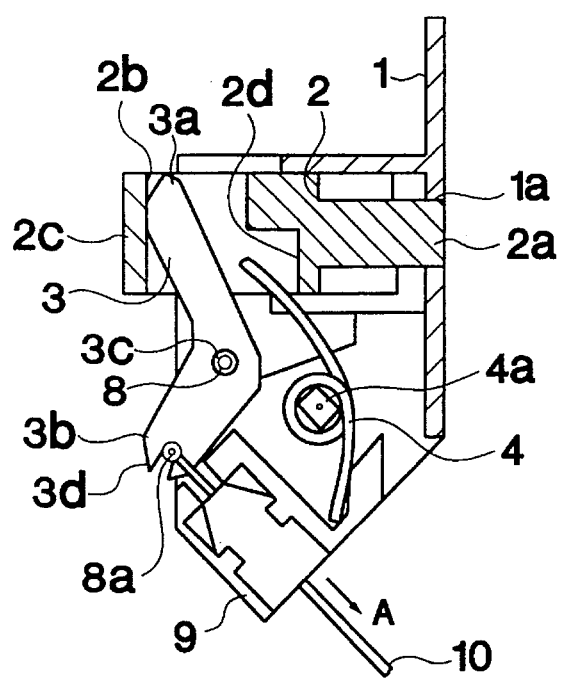
FIG. 3(B) is a sectional view of FIG. 1, showing operation of the release mechanism for a fuel filler door in an open position according to the present invention.

Referring now in detail to the drawings for the purpose of illustrating preferred embodiments of the present invention, the release mechanism for a fuel filler door of a vehicle as shown in FIGS. 2, 3(A) and 3(B), includes an outer casing member 1, a piston member 2 slidably disposed within the upper portion of the outer casing member 1, a pivotally movable lever 3 operatively connected to the piston member 2, a spring member 4 for biasing the piston member 2, and a release cable 10 connected to one end of the pivotally movable lever 3 and a switch lever (not shown) disposed on a dashboard of a vehicle.

The outer casing member 1 contains an opening 1a disposed on one side thereof for slidably receiving a piston portion 2a of the piston member 2.

The piston member 2 includes the piston portion 2a, an insert groove 2b, and a first inner end surface 2c and a second inner end surface 2d both disposed within the insert groove 2b. The piston portion 2a slidably moves through the opening 1a formed in the outer casing member 1.

The pivotally movable lever 3 having an L-shaped configuration includes a first arm 3a extending into the insert groove 2b of the piston member 2, a second arm 3b selectively actuable by the release cable 10, and a center aperture 3c disposed on a middle and bent portion thereof for pivotally receiving a center pin 8. The second arm 3b of the pivotally movable lever 3 contains an opening aperture 3d for pivotally receiving a pin 8a connected to the release cable 10.

The spring member 4 is disposed within the lower portion of the outer casing member 1 and includes an upper wing 4d extending into the insert groove 2b and normally biased against the second inner end surface 2d of the piston member 2. If the first arm 3a of the pivotally movable lever 3 acts on the first inner end surface 2c of the piston member 2, the upper wing 4d is pulled against its biasing force. The spring member 4 is pivotally operated about a spring shaft 4a as shown in FIGS. 3(A) and 3(B).

As shown in FIGS. 3(A) and 3(B), the release cable 10 is connected to the pin 8a by guiding within a guide member 9 so as to accelerate the release cable for moving forwardly and backwardly in a straight line.

The release mechanism for a fuel filler door of a vehicle according to the present invention operates as follows. As shown in FIGS. 3(A) and 3(B), when the user wants to open the fuel filler door 12 and pulls a switch lever (not shown) disposed on the dashboard of the vehicle, the release cable 10 moves forwardly in the direction indicated by arrow (A) shown in FIG. 3(B).

At this time, the second arm 3b of the pivotally movable lever 3 is pivotally pulled downwardly about the outer center pin 8 and simultaneously the first arm 3a of the pivotally movable lever 3 acts on the inner end surface 2c of the piston member 2. Finally, the piston portion 2a releases from a hook plate 11 and the fuel filler door 12 is opened.

In turn, when the fuel filler door 12 is closed, the spring member 4 biases the piston member 2 into engagement with the hook plate 11 by pressing the upper wing 4d of the spring member 4 against the second inner surface 2d of the piston 2 about the spring shaft 4a after the user pulls the switch lever, so that the fuel filler door 4 is locked as shown in FIG. 3(A).

Accordingly, the release mechanism for a fuel filler door of a vehicle has a number of advantages such as, for example, a short distance of the piston member 2 operatively connected to the spring member 3 and operation of the piston member since the spring member is positioned under and within the piston member; only a small space is occupied by the release cable 10 since the release cable 10 is connected to the second arm 3b of the pivotally movable lever 3; and a compact size reduces an amount of space used in a vehicle compared with the conventional release mechanism for a fuel filler door of a vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A release mechanism for a fuel filler door, comprising:
   an outer casing member having a substantially longitudinal opening formed therein, the outer casing member having a first end and an opposing second end;
   a piston member slidably positioned within the longitudinal opening of said outer casing member, said piston member including a piston portion, an insert groove and first and second opposing inner end surfaces disposed within said insert groove;
   a pivotally movable lever having a first arm extending into the insert groove of said piston member and a second arm selectively actuable by a release cable; and
   means, positioned substantially parallel to said pivotally movable lever, for normally biasing said piston member such that the piston portion is extended through the second end of the longitudinal opening of said outer casing member unless the first arm of said pivotally movable lever acts on the first inner end surface of said piston member; and
   means for actuating said pivotally movable lever.

2. The release mechanism for a fuel filler door according to claim 1, wherein said pivotally movable lever has an L-shaped configuration and includes a center aperture for pivotally receiving a center pin, so that the pivotally movable lever is pivotally moved about the center pin.

3. The release mechanism for a fuel filler door according to claim 1, wherein said means for normally biasing said piston member is a spring member having an upper wing positioned within said insert groove of the piston member and a spring shaft, so that the spring member and piston member are merged to be compact.

4. The release mechanism for a fuel filler door according to claim 1, wherein said means for actuating said pivotally movable lever is the release cable connected to said second arm of said pivotally movable lever through a pin disposed in the opening aperture of said second arm, the release cable being guided along a guide member.

5. The release mechanism for a fuel filler door according to claim 1, wherein the first end of said outer casing is an open end and the second end of said outer casing is a closed end.

6. The release mechanism for a fuel filler door according to claim 2, wherein a first arm of said L-shaped lever is positioned substantially parallel to said means for biasing and a second arm of said L-shaped lever is positioned substantially transverse to said means for biasing, thereby enabling a relatively small spacing between said lever and said fuel filler door.

7. The release mechanism for a fuel filler door according to claim 2, wherein said means for normally biasing said piston member is a spring member having an upper wing positioned within said insert groove of the piston member and a spring shaft, so that the spring member and piston member are merged to be compact.

8. The release mechanism for a fuel filler door according to claim 2, wherein said means for actuating said pivotally movable lever is a release cable connected to said second arm of said pivotally movable lever through a pin disposed in the opening aperture of said second arm, the release cable being guided along a guide member.

9. The release mechanism for a fuel filler door according to claim 7, wherein a first arm of said L-shaped lever is positioned substantially parallel to the upper wing of said means for biasing and a second arm of said L-shaped lever is positioned substantially transverse to the upper wing of said means for biasing, thereby enabling a relatively small spacing between said lever and said fuel filler door.

10. The release mechanism for a fuel filler door according to claim 4, wherein at least a portion of said guide member is substantially interposed between said means for normally biasing and said pivotally moveable lever.

11. The release mechanism for a fuel filler door according to claim 8, wherein at least a portion of said guide member is substantially interposed between said means for normally biasing and said pivotally moveable lever.

* * * * *